(12) United States Patent
Nazari et al.

(10) Patent No.: US 11,144,453 B2
(45) Date of Patent: Oct. 12, 2021

(54) UNMAP TO INITIALIZE SECTORS

(71) Applicant: Hewlett Packard Enterprise Development LP, Houston, TX (US)

(72) Inventors: Siamak Nazari, Mountain View, CA (US); Thomas David Evans, Bellevue, WA (US); Faris Hindi, Fremont, CA (US); Daniel Aaron Harbaugh, Bellevue, WA (US); Anahita Afkham, Milpitas, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/090,930

(22) PCT Filed: Apr. 5, 2016

(86) PCT No.: PCT/US2016/026018
§ 371 (c)(1),
(2) Date: Oct. 3, 2018

(87) PCT Pub. No.: WO2017/176256
PCT Pub. Date: Oct. 12, 2017

(65) Prior Publication Data
US 2019/0108122 A1    Apr. 11, 2019

(51) Int. Cl.
*G06F 12/02*    (2006.01)
*G06F 3/06*    (2006.01)

(52) U.S. Cl.
CPC .......... *G06F 12/0253* (2013.01); *G06F 3/061* (2013.01); *G06F 3/0616* (2013.01);
(Continued)

(58) Field of Classification Search
CPC .. G06F 12/0253; G06F 3/0616; G06F 3/0631; G06F 3/0632; G06F 3/0679; G06F 12/0246; G06F 2212/7201
See application file for complete search history.

(56) References Cited

U.S. PATENT DOCUMENTS 6,412,080 B1 * 6/2002 Fleming .............. G06F 12/0246
711/103
8,230,159 B2    7/2012 Stenfort
(Continued)

FOREIGN PATENT DOCUMENTS

| EP | 1873649 | 1/2008 |
| JP | 2007-011929 A | 1/2007 |
| WO | WO-2013040052 | 3/2013 |

OTHER PUBLICATIONS

PCT/ISA/KR, International Search Report and Written Opinion, dated Dec. 29, 2016 for PCT/US2016/026018, 11 pages.
(Continued)

*Primary Examiner* — Masud K Khan
(74) *Attorney, Agent, or Firm* — Trop, Pruner & Hu, P.C.

(57) ABSTRACT

In some examples, sectors of a solid-state drive are unmapped to initialize the sectors. The sectors include a data portion and a protection portion. When an unmapped sector is read, the solid-state drive can return a pre-set value for the unmapped sector, where the pre-set value includes a known fixed value to represent the protection portion of the unmapped sector. The storage controller is to recognize the known fixed value returned by the solid-state drive responsive to the read as representing the unmapped sector as being initialized, but not written to.

18 Claims, 2 Drawing Sheets

(52) U.S. Cl.
CPC .......... *G06F 3/0631* (2013.01); *G06F 3/0632* (2013.01); *G06F 3/0638* (2013.01); *G06F 3/0679* (2013.01); *G06F 3/0688* (2013.01); *G06F 12/0246* (2013.01); *G06F 2212/7201* (2013.01); *G06F 2212/7209* (2013.01)

(56) References Cited

U.S. PATENT DOCUMENTS

| | | | |
|---|---|---|---|
| 8,738,846 | B2 | 5/2014 | Son et al. |
| 8,904,092 | B2 | 12/2014 | Tucek |
| 8,938,584 | B2 | 1/2015 | Nelogal et al. |
| 9,263,102 | B2 | 2/2016 | Flynn et al. |
| 2009/0193219 | A1 | 7/2009 | Ohira et al. |
| 2009/0222613 | A1* | 9/2009 | Kurashige ............ G06F 12/0246 711/103 |
| 2010/0122055 | A1 | 5/2010 | Hafner |
| 2011/0099320 | A1 | 4/2011 | Lucas et al. |
| 2011/0202709 | A1 | 8/2011 | Rychlik |
| 2013/0226887 | A1* | 8/2013 | Braam .................. G06F 3/067 707/697 |
| 2016/0092121 | A1 | 3/2016 | Harbaugh et al. |
| 2016/0098199 | A1* | 4/2016 | Golden ................ G06F 3/0604 711/102 |
| 2017/0039001 | A1* | 2/2017 | Tailliet .................. G06F 3/061 |

OTHER PUBLICATIONS

Petersen, M.K., "Linux & Advanced Storage Interfaces", https://oss.oracle.com/~mkp/docs/linux-advanced-storage.pdf; Jul. 22, 2011, 12 pages.

24HourAdmin, "What is Trim and How Does it Affect Your SSD Recovery?," available online at <https://web.archive.org/web/20111108233653/https://www.24hourdata.com/blog/what-trim-and-how-does-it-affect-your-ssd-recovery>, Jan. 10, 2011 , 4 pages.

Bestofmedia Team, "Upgrading and Repairing PCs 21st Edition: Flash Storage,", Tom's Hardware, available online at <https://www.tomshardware.com/reviews/flash-removable-storage-ssd-drive,3626-6.html>, Aug. 3, 2014, 8 pages.

Curtis Ballard, "SBC-4 Disabled protection information," Sep. 15, 2016, INCITS T10, T10/16-171r3, 12 pages.

Curtis Ballard, "SBC-4 More provisioning reporting," May 6, 2015, INCITS T10, T10/15-007r5, 17 pages.

David L. Black, "SBC-3: Write Same unmap bit (08-356r4),", INCITS Technical Committee T10, 08-356r4, Dec. 10, 2008, 4 pages.

Frederick Knight, "SBC-3 Thin Provisioning Commands," correspondence to INCITS Technical Committee T10, available online at <http://www.t10.org/cgi-bin/ac.pl?t=d&f=08-149r9.pdf>, Jan. 14, 2009, 32 pages.

Intel Corporation, "Definitions," NVM Express revision 1.0 specification, Section 1.6 , 2011, available online at <https://nvmexpress.org/wp-content/uploads/NVM-Express-1_0-Gold.pdf>. 4 pages.

Knight et al., "SBC-3 Thin Provisioning Get LBA Status Command,", INCITS Technical Committee T10, 08-341r6, NetApp, Jul. 16, 2009, 5 pages.

NVM Express, Inc., "Deallocate," NVM Express revision 1.2 specification, Section 6.7.1.1, available online at <https://nvmexpress.org/wp-content/uploads/NVM_Express_1_2_Gold_20141209.pdf>, Nov. 3, 2014, 3 pages.

\* cited by examiner

UNMAP TO INITIALIZE SECTORS

BACKGROUND

Solid State Drives (SSDs) are non-volatile data storage devices that are used for persistent data storage, but unlike hard disks drives, contain no moving parts. Some SSD drives use flash memory, which can retain data without being powered. One drawback of flash memory is that each memory cell of a flash-based SSD can be written only a limited number of times before the memory cell fails.

BRIEF DESCRIPTION OF THE DRAWINGS

The following detailed description references the drawings, wherein.

DETAILED DESCRIPTION

Figure 1:
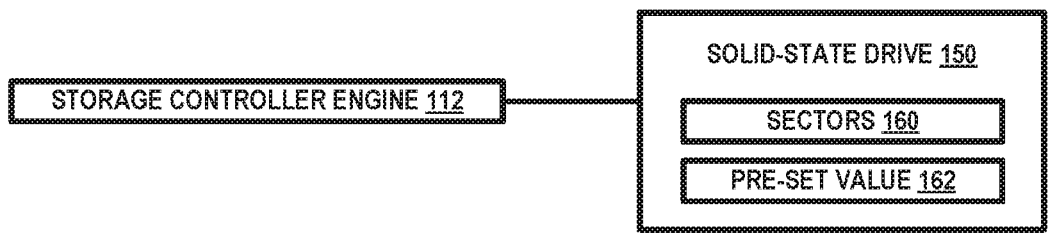
FIG. 1 is a block diagram of a storage system including a storage controller engine capable of unmapping sectors of a solid-state drive to initialize the sectors for use, according to an example.

Storage drives, such as hard drives and solid-state drives (SSDs) can be used to store information. When storing information, it is beneficial to know the integrity of the stored data. As such, a disk sector that normally has a set value of data bytes (e.g., 512 bytes) used for data ("data portion") can be extended to include a protection portion or Data Integrity Field (DIF). In some examples, the DIF can have 8 bytes. As such, in one example, a 512 byte disk sector including the DIF can be extended to be 520 bytes. In one example, the DIF can be used to represent a cyclic redundancy check (CRC), a representation of the sector (e.g., an offset to identify the sector), an identifier of the disk, combinations thereof, etc.

As such, when using a protection portion or DIF, a scheme can be used to ensure that the data portion is correct. For example, even if the data portion of a sector was written as zero, to confirm that the zero number was intentional, the protection portion would be set in a manner that can be analyzed to confirm that the zeros are intentional. Thus, it is useful to initialize the sectors with that particular information. Additionally, this confirmation may be used by other implementations, for example, a system implementing a redundant array of independent disks (RAID), such as RAID 1, RAID 5, RAID 6, etc. Initializing sectors traditionally writes to each one of the sectors.

Initializing sectors on a disk can be time consuming because each sector is written to. Further, in the case of SSDs, writing reduces the lifespan of the respective SSDs. Over time, some storage cells may begin to wear out and become unreliable.

Accordingly, various examples described herein relate to using an unmap function in SSDs to initialize drives. In one example, the unmap function of the SSDs can place or put the sectors in over-provisioned space of the SSD until a storage controller writes data to the respective unmapped sectors. When a sector that is unmapped is read, the SSD can return a pre-set value. In one example, the pre-set value can be set by an SSD manufacturer. In another example, the pre-set value can be set by a storage controller using a command. The pre-set value can include an expected number of bytes representing the sector that is being read and can include a representation for both the data portion and the protection portion.

In one example, a storage controller may be used to manage a single SSD or multiple SSDs (e.g., using a RAID configuration). The storage controller can know what sectors the storage controller would like to allocate from the SSD for particular uses. If an unmapped sector is read, the pre-set value is returned by the SSD. Moreover, the pre-set value can include a known fixed value representing the protection portion that is recognized by the storage controller as representing sectors as being initialized, but not written to. When an unmapped sector is written to, the sector can be written with both the data portion and corresponding protection portion. At this point, the sector is mapped. When the storage controller reads a sector, it can check the sector's protection portion against either the expected value for written data or against the known fixed value. If either matches, the sector can be considered good. If neither matches, the data can be considered bad and the storage controller can take steps to remedy the issue.

As noted, the sectors on the SSDs can be initialized by unmapping the sectors on the respective SSD. The unmapping can be in the form of a command that selects a sector to start the unmapping and an offset. Further, the unmapping can occur using metadata in the SSD rather than writing to each sector. As such, the approach may be faster and help mitigate drive aging.

Further, in other examples, an SSD, when added to an array or enclosure, when first seen by the storage controller, or when a command is given, can be initialized using the unmap approach. This enables quick usage of the SSD without writing to each sector. In another example, sectors can be unmapped for initialization when a usage (e.g., a RAID implementation, allocated virtual disk space, etc.) of the sectors is stopped. Further, sectors can be initialized using the unmap approach during allocation of a virtual address space.

The storage controller may implement various approaches to communicate with SSDs, such as a Small Computer System Interface (SCSI), for example, by using one or more SCSI block commands.

Figure 2:
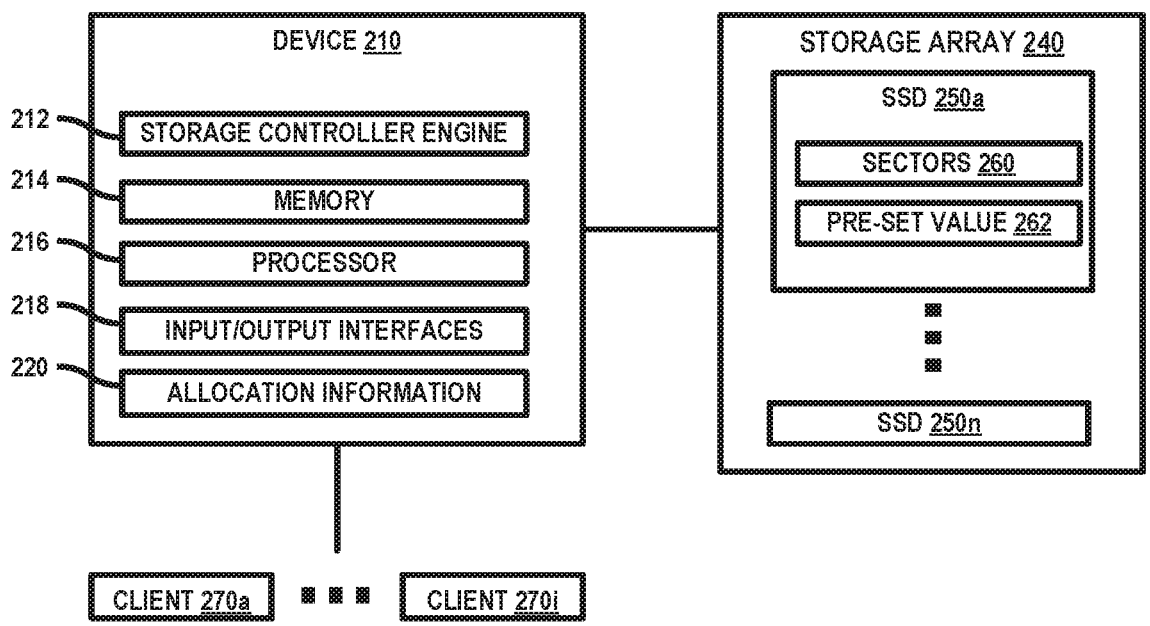
FIG. 2 is a block diagram of a storage system including a device including a storage controller engine capable of unmapping sectors of a solid-state drive to initialize the sectors for use, according to an example.

FIG. 1 is a block diagram of a storage system including a storage controller engine capable of unmapping sectors of a solid-state drive to initialize the sectors for use, according to an example. FIG. 2 is a block diagram of a storage system including a device including a storage controller engine capable of unmapping sectors of a solid-state drive to initialize the sectors for use, according to an example. It will be appreciated that the storage system 100 shown in FIG. 1 is only one example of a storage system. In one implementation, the storage system 100 may include various additional storage devices (including SSDs as well as other storage drives) and networks, which may be interconnected in any suitable fashion, depending on the design considerations of a particular implementation. For example, a large storage system may include more client computers and storage devices than shown in this illustration.

In one example, storage system 100 can include a storage controller engine 112 communicatively coupled to an SSD 150. The SSD 150 can include a number of sectors 160.

Further, the SSD 150 can include a pre-set value 162 that can be provided by the SSD 150 to the storage controller engine 112 if the storage controller engine 112 reads an unmapped sector.

In another example, storage system 200 can include a device 210 including a storage controller engine 212 that is communicatively coupled to one or more SSDs 250a-250n in a storage array 240. The respective SSDs 250 can include a number of sectors 260 and also return a pre-set value 262 to the storage controller engine 212.

The storage systems 100, 200 can provide data storage resources to any number of client computers (e.g., client 270a-client 270i), which may be general purpose computers, workstations, mobile computing devices, and the like. The storage systems 100, 200 can include one or more storage array 240 or direct coupling to drives. The clients 270 can be coupled to a storage system 200 directly or through a network, which may be a local area network (LAN), wide area network (WAN), a storage area network (SAN), or other suitable type of network.

The client computers 270 can access the storage space of the storage arrays 240 by sending Input/Output (I/O) requests to Input/Output interfaces 218 provided by device 210. The I/O requests can include write requests and read requests, etc. to the storage array 240. The storage controller engine 212 can process the I/O requests so that user data is written to or read from the appropriate storage locations in the storage array(s) 240. As used herein, the term "user data" refers to data that may be used in the course of business, performance of a job function, or for personal use, such as business data and reports, Web pages, user files, image files, video files, audio files, software applications, or any other similar type of data that that a user may wish to save to long term storage. When the storage controller engine 212 allocates data portions of one or multiple SSDs 250 or other drives in the storage array 240, allocation information 220 can be stored. The allocation information can include what regions of one or multiple drives belong to particular user data. The allocation information can also be used to track drive identifiers. Moreover, the allocation information can be used to facilitate implementation of RAID across multiple disks.

The storage arrays 240 may include various types of persistent storage, including SSDs 250. In some examples, the SSDs 250 are flash drives. However, the SSDs 250 may also use other types of persistent memory, including resistive memory, for example. Each storage array 240 can include one or more SSDs 250.

The storage controller engine 212 can also controls the allocation of storage space in each drive SSD 150, 250. In some examples, clients 270 may also be served using other devices with storage controllers to control storage. In one example, the storage controller engine 212 controls the memory allocation for a certain sub-set of the SSDs 250. In another example, the storage controller engine 212 can control memory allocation of all of the SSDs 250 in the storage array 240 (or in the example of storage system 100, storage controller engine 112 can control allocation of the single SSD 150). Other arrangements are also possible depending on the design considerations of a particular implementation. Additionally, certain details of the storage system configuration can be specified by an administrator.

In one example, storage controller engine 212 can map some portion of the available storage space of an SSD 250 as a user data region. The user data region represents storage space that exposed to the file system and is visible to a client computer. A user of the client computer 270 can store data to and receive data from the user data region.

As noted above, the SSD drive 150, 250 can include a number of sectors. Further, each of the sectors can include a data portion for user data and a protection portion to ensure that the user data is valid. Further, the SSD drive 150, 250 can support an unmap command to mark sectors as not being in use. As noted above, the unmap command can set the unmapped sectors into over-provisioned space of the SSD drive 150, 250.

Moreover, when a storage controller engine 112, 212 reads respective unmapped sectors, the respective SSD 150, 250 returns a pre-set value 162, 262 for the respective unmapped sectors. The pre-set value 162, 262 can be used to represent the data portion and the protection portion of the sector being read. The pre-set value 162, 262 can be the same for each unmapped sector on the SSD. Further, the pre-set value 162, 262 can include a known fixed value to represent the protection portion. In one example, the pre-set value includes a different value from the known fixed value for the data portion. Further, in one example, the different value used to represent the data portion can include 0. Moreover, the known fixed value can have a non-zero value. In some examples, the storage controller engine 112, 212 can set the respective pre-set values 162, 262, including the known fixed value, for respective SSDs 150, 250.

As noted above, in one example, the data portion of a sector can include 512 bytes while each protection portion includes 8 bytes. In the example above, each of the data bytes can be represented by a zero value of 0x00 for the pre-set value 162, 262. Further, in one example, the 8 protection bytes can be represented by a value of 00 00 FF FF FF FF FF FF (or two bytes of 0x00 followed by 6 bytes of 0xFF).

As noted above, the protection portion can be used to take into account a CRC for the data portion, an offset representing the respective sectors 160, 260, and an identifier of the SSD 150, 250. In the example above, a CRC of 512 bytes can be represented by 16 bits (or 2 bytes). In the example, these bytes are represented by 0x0000. Moreover, the remaining 6 bytes are represented by FFFFFFFFFFFF. These bytes can be used by the storage controller engine 212 to represent the offset of the sectors and a drive identifier. The size of the 6 bytes used to represent each can be dependent on the implementation of storage arrays 240 and/or SSDs 150, 250 used by a particular storage controller engine 112, 212. In other examples, the sector can be a different size (e.g., with a 4096 byte data portion). In these examples, the protection portion can be implemented to take into consideration the size of the data portion. As noted above, the known fixed value can be different from the example provided. One criteria that can be taken into account when choosing the known fixed value is that the values for the sector offset and/or disk identifier can selected in a manner such that the combination is unlikely to occur when writing user data. In some examples, the storage controller engine 112, 212 can use a known fixed value that cannot occur in an implementation of the respective system 100, 200.

As noted above, when the storage controller engine 112, 212 can initialize the individual sectors 160, 260 by unmapping the respective sectors. In one example, the unmapping can be done using a start address and an offset for the number of sectors to unmap. Further, subsets of the respective sectors 160, 260 can be unmapped for initialization. For example, if the storage controller engine 112, 212 determines to allocate sectors 160, 260 (e.g., for use with a particular user data region) for use, the storage controller engine 112, 212 can unmap those sectors to initialize the sectors. This approach of unmapping the sectors can be enabled because the storage controller engine 212 can recognize that the known fixed value, when read, represents a sectors that has been initialized, but not written two. In further examples, the entire pre-set value 162, 262 can be compared by the storage controller engine 212 to recognize that a particular sector has been initialized, but not written to.

In one example of one usage of the initialization approach, when a storage controller engine 112, 212 writes data to the sectors 160, 260, written user data can include the data in the data portion and corresponding protection portion value (e.g., a representation of CRC, sector offset, and drive identifier). When writing to an initialized sector that has not previously written to, the SSD 150, 250 may consider the sector as being over-provisioned space, however, the storage controller engine 112, 212 can recognize the sector as allocated for a particular purpose (e.g., user data). As such, the storage controller engine 212 can use the sectors 160, 260. When a read of a sector is performed by the storage controller engine 112, 212, if the value of the respective protection portion of the sector being read is not the known fixed value or an expected respective protection portion value of the sector with the associated user data, an error can be identified. In certain examples, the error can be used to fail an associated SSD 250, for metrics, etc.

In some examples, the SSD itself 150, 250 may have internal approaches to ensure that data is mapped to sectors in proper condition for use. The approaches may include re-mapping sectors to other over-provisioned space.

In one example, the initialization of sectors can occur after the breakdown of a RAID implementation. In another example, the initialization of sectors can occur during the start of a new RAID implementation (e.g., for the allocation of space for user data over multiple disks). As noted above, multiple virtual RAID implementations can be used across multiple disks. Further, when an SSD in a RAID implementation fails, the SSD can be replaced with another SSD. The information for the failed SSD can be rebuilt from other disk(s) storing redundant information. During this process, the sectors can be quickly initialized by unmapping the sectors to be used in the replacement SSD. Further, in other examples, an SSD, when added to an array or enclosure, when first seen by the storage controller engine 112, 212, or on a command can be initialized using the unmap approach. This enables quick usage of the SSD without writing to each sector. In another example, sectors can be unmapped for initialization when a usage (e.g., a RAID implementation, allocated virtual disk space, etc.) of the sectors is stopped. As noted above, sectors can be initialized using the unmap approach during allocation of a virtual address space.

The engines 112, 212 include hardware and/or combinations of hardware and programming to perform functions provided herein. Moreover, the modules (not shown) can include programing functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 216, such as a central processing unit (CPU) or a microprocessor suitable for retrieval and execution of instructions and/or electronic circuits can be configured to perform the functionality of any of the engines 112, 212 described herein. In certain scenarios, instructions and/or other information, such as the pre-set value 262, can be included in memory 214 or other memory. Input/output interfaces 218 may additionally be provided by device 210. Moreover, in certain embodiments, some components can be utilized to implement functionality of other components described herein. Input/output devices such as communication devices like network communication devices or wireless devices can also be considered devices capable of using the input/output interfaces 218.

The storage controller engine 112, 212 may be configured to communicate with other computing devices such as clients 270 to allow the computing devices to access storage provided by the storage array 240 over a storage network. In one example, the storage network may be a Storage Area Network (SAN) or other network.

The storage controller engine 212 may be configured to process requests from clients to process input records and write them as output data records to storage and read data records from the storage. The requests may include requests or commands to write data records to a storage device and read data records from the storage device. The storage controller engine 212 may respond to the requests with acknowledgments in the form of messages with data according to particular protocols and the like.

In one example, storage controller engine may be configured to respond to a write request to write a data record. In some examples, data may comprise fields or entries containing blocks or groups of data.

Figure 3:
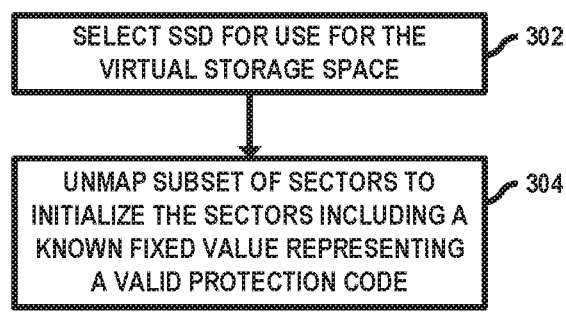
FIG. 3 is a flowchart of a method for unmapping sectors of a solid-state disk to initialize the sectors, according to an example.
Figure 4:
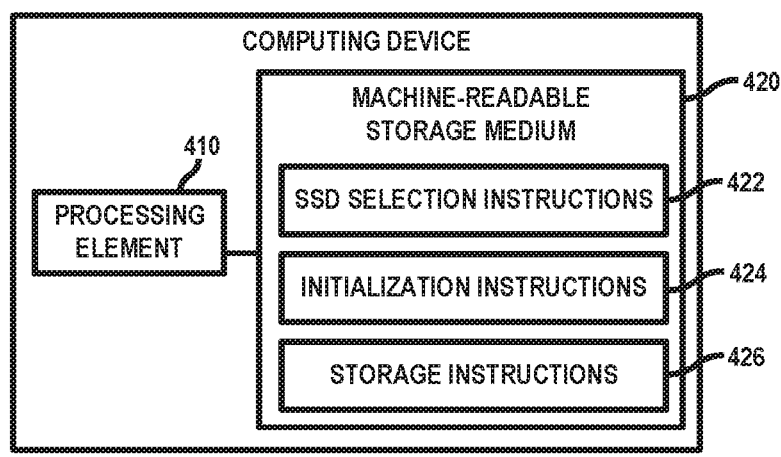
FIG. 4 is a block diagram of a computing device capable of unmapping sectors of a solid-state disk to initialize the sectors, according to an example.

FIG. 3 is a flowchart of a method for unmapping sectors of a solid-state disk to initialize the sectors, according to an example. FIG. 4 is a block diagram of a computing device capable of unmapping sectors of a solid-state disk to initialize the sectors, according to an example. Although execution of method 300 is described below with reference to computing device 400, other suitable components for execution of method 300 can be utilized (e.g., device 210). Additionally, the components for executing the method 300 may be spread among multiple devices. Method 300 may be implemented in the form of executable instructions stored on a machine-readable storage medium, such as storage medium 420, and/or in the form of electronic circuitry. In some examples, the computing device can include a storage controller that can control storage on one or more disks. The disks can be SSDs.

The computing device 400 can receive a request to create a virtual storage space. The virtual storage space can be used for user data. The request can come from, for example, a client device. The request for the virtual storage space can be directed at a particular drive or be a general request to allocate the space, where the computing device 400 can choose how to allocate space. In other examples, drives can be used for virtual storage space for other reasons, for example, as part of restoring a drive removed from a RAID implementation.

At 302, SSD selection instructions 422 can be executed by the processing element 410 to select an SSD for use for the virtual storage space. In one example, the SSD can be a single SSD drive. In another example, the SSD can be a part of a RAID implementation. In one example, as part of restoring a RAID implementation, the SSD drive can be selected. The SSD drive can be selected for various criteria, for example, availability of space, a priority indicator, an age of the drive, a health condition of the drive, use of the drive in another implementation, etc.

As noted above, the SSD drive can include a number of sectors. Each of the sectors can include a data portion and a protection portion. Further, the SSD can support an unmap command to mark sectors as not being in use (e.g., by putting the sectors in to an over-provisioned space). Storage instructions 426 can be executed by the processing element 410 to read and/or write to the SSD and/or multiple SSDs in an array. When unmapped sectors are read, the SSD can return a pre-set value for the respective data portion and the respective protection portion of the respective sector read.

The pre-set value can include a known fixed value for the representation of the protection portion. As noted above, the pre-set value can include a different value from the known fixed value to represent the data portion. In one example, the value to represent the data portion can be 0, while the known fixed value has a non-zero value. Moreover, in one example, the data portion can include 512 bytes while the protection portion includes 8 bytes. In this example, the pre-set value can include 514 bytes of 0x00 followed by 6 bytes of 0x00. In this example, the different value includes 512 bytes of 0x00 and the known fixed value includes 00 00 FF FF FF FF FF FF. In other examples, other values can be used. In one example, initialization instructions 424 can be executed to set the pre-set value. As noted above, the known fixed value can be different. One criteria that can be taken into account when choosing the known fixed value is that the values for the sector offset and/or disk identifier can selected in a manner such that the combination is unlikely to occur when writing user data. In some examples, the computing device can use a known fixed value that cannot occur in an implementation of the system.

Moreover, in one example, the computing device 400 can recognize that the known fixed value represents a valid protection code when it is read and/or it is read in conjunction with a data portion read as a value of zero. The recognition enables the initialization of sectors using the unmap command. At 304, initialization instructions 424 can be executed by processing element 410 to unmap a subset of sectors of the SSD to initialize the subset of sectors for the virtual storage space. As noted above, in one example, the sectors can be unmapped by using the unmap command supported by the SSD. The unmap command may be implemented, for example, using an address of a first sector to be unmapped and an offset. With this approach, sectors can be quickly initialized because instead of writing to each sector, metadata in the SSD can be changed using the unmap command.

Storage instructions 426 can be executed by the processing element 410 to read and/or write to sectors of the SSD(s). In one example, data can be written to a portion of sectors in the virtual storage space. As noted above, in some examples protection portions of the sectors written with user data can include information about a CRC, an offset representing the sector, and an identifier of the particular SSD.

When the processing element 410 executes the storage instructions 426 to read from sectors of the SSD, if the value of the respective protection portion of the sector is not the known fixed value or an expected respective protection portion, an error can be identified.

In one example of one usage of the initialization approach, when the computing device 400 writes data to the sectors, written user data can include the data in the data portion and corresponding protection portion value (e.g., a representation of CRC, sector offset, and drive identifier). When writing to an initialized sector that has not previously written to, the SSD may consider the sector as being over-provisioned space, however, the computing device 400 can recognize the sector as allocated for a particular purpose (e.g., user data for virtual storage space). As such, the computing device 400 can use the sectors.

When a read of a sector is performed by the computing device, if the value of the respective protection portion of the sector being read is not the known fixed value or an expected respective protection portion value of the sector with the associated user data, the noted error can be identified. In certain examples, the error can be used to fail an associated SSD, for metrics, or the like.

In some examples, the SSD itself may have internal approaches to ensure that data is mapped to sectors in proper condition for use. The approaches may include re-mapping sectors to other over-provisioned space.

In one example, the initialization of sectors can occur after the breakdown of a RAID implementation. In another example, the initialization of sectors can occur during the start of a new RAID implementation (e.g., for the allocation of space for user data over multiple disks). As noted above, multiple virtual RAID implementations can be used across multiple disks. Further, when an SSD in a RAID implementation fails, the SSD can be replaced with another SSD. The information for the failed SSD can be rebuilt from other disk(s) storing redundant information. During this process, the sectors can be quickly initialized by unmapping the sectors to be used in the replacement SSD.

Processing element 410 may be, one or multiple central processing unit (CPU), one or multiple semiconductor-based microprocessor, one or multiple graphics processing unit (GPU), other hardware devices suitable for retrieval and execution of instructions stored in machine-readable storage medium 420, or combinations thereof. The processing element 410 can be a physical device. Moreover, in one example, the processing element 410 may include multiple cores on a chip, include multiple cores across multiple chips, multiple cores across multiple devices (e.g., if the computing device 400 includes multiple node devices), or combinations thereof. Processing element 410 may fetch, decode, and execute instructions 422, 424, 426 to implement initialization of SSDs using an unmapping command. As an alternative or in addition to retrieving and executing instructions, processing element 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for unmapping sectors in an SSD to initialize the sectors.

The computing device 400 may be configured to communicate with other computing devices such as host computing devices over network using network techniques. The network techniques may include any means of electronic or data communication. The network may include a local area network, Internet and the like. The network techniques may include Fibre Channel network, SCSI (Small Computer System Interface) link, Serial Attached SCSI (SAS) link and the like. The network techniques may include switches, expanders, concentrators, routers, and other communications devices.

In examples described herein, computing device 400 may communicate with components implemented on separate devices or system(s) via a network interface device of the computing device. In another example, computing device 400 may communicate with storage devices via a network interface device of the computing device and storage device. In another example, computing device 400 may communicate with other computing devices via a network interface device of the computing device. In examples described herein, a "network interface device" may be a hardware device to communicate over at least one computer network. In some examples, a network interface may be a Network Interface Card (NIC) or the like. As used herein, a computer network may include, for example, a Local Area Network (LAN), a Wireless Local Area Network (ALAN), a Virtual Private Network (VPN), the Internet, or the like, or a combination thereof. In some examples, a computer network may include a telephone network (e.g., a cellular telephone network).

The foregoing describes a novel and previously unforeseen approach for storage management. While the above disclosure has been shown and described with reference to the foregoing examples, it should be understood that other forms, details, and implementations may be made without departing from the spirit and scope of this disclosure.

What is claimed is:

1. A storage system comprising:
a solid-state drive comprising a plurality of sectors, each sector of the plurality of sectors to include a data portion and a protection portion,
wherein the solid-state drive is to support an unmap command to mark a sector of the plurality of sectors as not being in use; and
a storage controller to unmap, using the unmap command, a first sector of the solid-state drive to initialize the first sector,
wherein the storage controller is to unmap, using the unmap command, the first sector by changing metadata of the solid-state drive without writing to the first sector,
wherein the solid-state drive is to, responsive to a read of the unmapped first sector, return a pre-set value for a respective data portion and a respective protection portion of the unmapped first sector, wherein the pre-set value includes an 8 byte known fixed value of 00 00 FF FF FF FF FF FF for the respective protection portion of the unmapped first sector, and
wherein the storage controller is to recognize the known fixed value returned by the solid-state drive responsive to the read as representing the unmapped first sector as being initialized, but not written to.

2. The storage system of claim 1, wherein the pre-set value includes a zero value, different from the known fixed value, to represent the respective data portion of the unmapped first sector.

3. The storage system of claim 2, wherein the known fixed value for the respective protection portion includes a two bytes of 00 00 representing a cyclic redundancy check value for the zero value included in the pre-set value to represent the respective data portion.

4. The storage system of claim 3, wherein the pre-set value includes 512 data bytes for the respective data portion of the unmapped first sector and the 8 byte known fixed value for the respective protection portion of the unmapped first sector, wherein each data byte of the 512 data bytes of the respective data portion is represented by a zero value of 0x00.

5. The storage system of claim 1, wherein the storage controller is further to write data to the unmapped first sector, wherein the respective protection portion is written to include a cyclic redundancy check value, an offset representing the unmapped first sector, and an identifier of the solid-state drive, wherein the writing to the unmapped first sector causes the first sector to be mapped.

6. The storage system of claim 1, wherein the changing of the metadata is responsive to the unmap command.

7. The storage system of claim 1, wherein the unmap command comprises a start address and an offset to indicate a number of sectors of the solid-state drive to unmap.

8. The storage system of claim 1, wherein the storage controller is to:
receive, in response to a read of a given sector of the plurality of sectors, a value of a protection portion of the given sector from the solid-state drive,
determine whether the received value is the known fixed value or an expected protection portion value associated with data in the given sector, and
in response to determining that the received value is not the known fixed value and is not the expected protection portion value, indicate an error for the read of the given sector.

9. A non-transitory machine-readable storage medium storing instructions that upon execution cause a storage controller to:
select a solid-state drive separate from the storage controller to use for a virtual storage space, wherein the solid-state drive comprises a plurality of sectors, and each sector of the plurality of sectors includes a data portion and a protection portion, and wherein the solid-state drive supports an unmap command to mark sectors as not being in use;
unmap, by issuing the unmap command from the storage controller to the solid-state drive, a first sector of the solid-state drive to initialize the first sector for the virtual storage space by changing metadata of the sold-state drive without writing to the first sector;
in response to a read of the unmapped first sector, receive a pre-set value returned by the solid-state drive, the pre-set value comprising a first value for a respective data portion of the unmapped first sector and comprising an 8 byte known fixed value of 00 00 FF FF FF FF FF FF for a respective protection portion of the unmapped first sector; and
determine, based on the known fixed value returned by the solid-state drive responsive to the read, that the unmapped first sector is initialized but not written to.

10. The non-transitory machine-readable storage medium of claim 9, wherein the first value of the pre-set value is 0.

11. The non-transitory machine-readable storage medium of claim 10, wherein the first value for the respective data portion of the unmapped first sector includes 512 data bytes, wherein the pre-set value includes 514 bytes of 0x00 followed by 6 bytes of 0xFF.

12. The non-transitory machine-readable storage medium of claim 11, wherein the known fixed value for the respective protection portion includes two bytes of 00 00 representing a cyclic redundancy check value for the first value of 0 for the respective data portion.

13. The non-transitory machine-readable storage medium of claim 9, wherein the instructions upon execution cause the storage controller to:

write data to the unmapped first sector, wherein the respective protection portion is written to include a cyclic redundancy check value, an offset representing the unmapped first sector, and an identifier of the solid-state drive, wherein the writing to the unmapped first sector causes the first sector to be mapped;

read a given sector of the plurality of sectors, and indicate an error responsive to a protection portion of the given sector containing a value that is neither the known fixed value nor an expected protection portion value for data contained in a data portion of the given sector.

14. The non-transitory machine-readable storage medium of claim 9, wherein the changing of the metadata is responsive to the unmap command.

15. The non-transitory machine-readable storage medium of claim 9, wherein the unmap command comprises a start address and an offset to indicate a number of sectors of the solid-state drive to unmap.

16. A method comprising:

accessing, by a computing device, a storage device separate from the computing device in response to an input/output request, wherein the storage device comprises a plurality of sectors, and each sector of the plurality of sectors includes a data portion and a protection portion, and wherein the storage device supports an unmap command to mark sectors of the plurality of sectors as not being in use;

unmapping, by the computing device by issuing the unmap command to the storage device, a first sector of the storage device to initialize the first sector, wherein the unmapping of the first sector based on issuing the unmap command comprises changing metadata of the storage device without writing to the first sector;

in response to a read of the unmapped first sector, receiving, by the computing device, a pre-set value returned by the storage device, the pre-set value comprising a first value for a respective data portion of the unmapped first sector and comprising an 8 byte known fixed value of 00 00 FF FF FF FF FF FF for a respective protection portion of the unmapped first sector; and determining, by the computing device based on the known fixed value returned by the storage device responsive to the read, that the unmapped first sector is initialized but not written to.

17. The method of claim 16, wherein, for the respective data portion of the unmapped first sector, the pre-set value includes 512 data bytes, wherein each data byte of the 512 data bytes is represented by a zero value of 0x00, and wherein the known fixed value for the respective protection portion of the pre-set value includes 00 00 as the first two bytes, representing a cyclic redundancy check value for the 512 data bytes of zero values.

18. The method of claim 16, wherein the changing of the metadata is responsive to the unmap command.

* * * * *